United States Patent
Eberle et al.

(10) Patent No.: US 8,727,758 B2
(45) Date of Patent: May 20, 2014

(54) REVERSE STRETCH ROD FOR MACHINE HYGIENE AND PROCESSING

(75) Inventors: Theodore F. Eberle, Ann Arbor, MI (US); G. David Lisch, Jackson, MI (US); Robert A. Cooper, Grass Lake, MI (US); Kirk Edward Maki, Tecumseh, MI (US); Michael T. Lane, Brooklyn, MI (US); Luke A. Mast, Brooklyn, MI (US)

(73) Assignee: Amcor Limited, Hawthorn (AU)

( * ) Notice: Subject to any disclaimer, the term of this patent is extended or adjusted under 35 U.S.C. 154(b) by 129 days.

(21) Appl. No.: 13/372,572

(22) Filed: Feb. 14, 2012

(65) Prior Publication Data

US 2012/0207873 A1 Aug. 16, 2012

Related U.S. Application Data

(60) Provisional application No. 61/442,906, filed on Feb. 15, 2011.

(51) Int. Cl.
*B29C 49/12* (2006.01)

(52) U.S. Cl.
USPC .............. 425/169; 425/171; 425/529

(58) Field of Classification Search
CPC ............. B29C 2049/1219; B29C 2949/78058; B29C 2949/78369; B29C 2949/78882
USPC .......................... 425/169, 171, 529
See application file for complete search history.

(56) References Cited

U.S. PATENT DOCUMENTS

| | | | |
|---|---|---|---|
| 3,267,185 A | | 8/1966 | Freeman, Jr. |
| 3,268,635 A | | 8/1966 | Kraus et al. |
| 3,993,427 A | | 11/1976 | Kauffman et al. |
| 4,039,641 A | | 8/1977 | Collins |
| 4,177,239 A | | 12/1979 | Gittner et al. |
| 4,321,938 A | | 3/1982 | Siller |
| 4,432,720 A | | 2/1984 | Wiatt et al. |
| 4,457,688 A | | 7/1984 | Calvert et al. |
| 4,490,327 A | | 12/1984 | Calvert et al. |
| 4,499,045 A | | 2/1985 | Obsomer |
| 4,539,172 A | | 9/1985 | Winchell et al. |
| 4,615,667 A | * | 10/1986 | Roy ............................. 425/135 |

(Continued)

FOREIGN PATENT DOCUMENTS

| | | |
|---|---|---|
| EP | 0849514 | 6/1998 |
| EP | 1529620 | 5/2005 |

(Continued)

OTHER PUBLICATIONS

Partial machine translation of JP-09272147 A, dated Oct. 1997, obtained from the JPO website.*

(Continued)

*Primary Examiner* — Robert B Davis
(74) *Attorney, Agent, or Firm* — Harness, Dickey & Pierce, P.L.C.

(57) ABSTRACT

A mold device for forming a plastic container from a preform. The mold device comprises a mold defining a mold cavity and a central exterior rod system moveably disposed within the mold cavity. The central exterior rod system is positionable between an extended position engagable with the preform and a retracted position spaced apart from the preform. The central exterior rod system maintains a central orientation of the preform during formation.

34 Claims, 6 Drawing Sheets

(56) References Cited

U.S. PATENT DOCUMENTS

| | | | |
|---|---|---|---|
| 4,725,464 A | 2/1988 | Collette | |
| 4,883,631 A | 11/1989 | Ajmera | |
| 4,935,190 A | 6/1990 | Tennerstedt | |
| 5,129,815 A | 7/1992 | Miyazawa et al. | |
| 5,269,672 A | 12/1993 | DiGangi, Jr. | |
| 5,389,332 A | 2/1995 | Amari et al. | |
| 5,403,538 A | 4/1995 | Maeda | |
| 5,540,879 A | 7/1996 | Orimoto et al. | |
| 5,599,496 A | 2/1997 | Krishnakumar et al. | |
| 5,611,987 A * | 3/1997 | Kato et al. | 264/458 |
| 5,622,735 A | 4/1997 | Krishnakumar et al. | |
| 5,635,226 A | 6/1997 | Koda et al. | |
| 5,681,520 A * | 10/1997 | Koda et al. | 264/520 |
| 5,687,550 A | 11/1997 | Hansen et al. | |
| 5,824,237 A | 10/1998 | Stumpf et al. | |
| 5,962,039 A | 10/1999 | Katou et al. | |
| 6,214,282 B1 | 4/2001 | Katou et al. | |
| 6,277,321 B1 | 8/2001 | Vailliencourt et al. | |
| 6,485,670 B1 | 11/2002 | Boyd et al. | |
| 6,502,369 B1 | 1/2003 | Andison et al. | |
| 6,692,684 B1 | 2/2004 | Nantin et al. | |
| 6,729,868 B1 | 5/2004 | Vogel et al. | |
| 6,749,415 B2 | 6/2004 | Boyd et al. | |
| 6,767,197 B2 | 7/2004 | Boyd et al. | |
| 7,141,190 B2 | 11/2006 | Hekal | |
| 7,314,360 B2 * | 1/2008 | Koda et al. | 425/3 |
| 7,473,388 B2 | 1/2009 | Desanaux et al. | |
| 7,553,441 B2 | 6/2009 | Shi | |
| 7,914,726 B2 | 3/2011 | Andison et al. | |
| 7,981,356 B2 | 7/2011 | Warner et al. | |
| 8,017,064 B2 | 9/2011 | Andison et al. | |
| 8,096,483 B2 | 1/2012 | Riney | |
| 2001/0010145 A1 | 8/2001 | Tawa et al. | |
| 2005/0067002 A1 | 3/2005 | Jones | |
| 2005/0206045 A1 | 9/2005 | Desanaux et al. | |
| 2006/0097417 A1 | 5/2006 | Emmer | |
| 2006/0231646 A1 | 10/2006 | Geary, Jr. | |
| 2008/0254160 A1 | 10/2008 | Rousseau et al. | |
| 2008/0271812 A1 | 11/2008 | Stefanello et al. | |
| 2010/0084493 A1 | 4/2010 | Troudt | |
| 2010/0213629 A1 | 8/2010 | Adriansens | |
| 2010/0303946 A1 | 12/2010 | Voth | |
| 2011/0265433 A1 | 11/2011 | Chauvin et al. | |
| 2012/0061885 A1 * | 3/2012 | Maki et al. | 264/531 |
| 2012/0091635 A1 * | 4/2012 | Eberle | 264/532 |

FOREIGN PATENT DOCUMENTS

| | | | |
|---|---|---|---|
| EP | 1577258 | | 9/2005 |
| EP | 1688234 | | 8/2006 |
| FR | 2887525 | | 12/2006 |
| JP | 57123027 | | 7/1982 |
| JP | 63-249616 | | 10/1988 |
| JP | 09057834 | | 3/1997 |
| JP | 09099477 | | 4/1997 |
| JP | 09272147 A | * | 10/1997 |
| JP | 10-217258 | | 8/1998 |
| JP | 2000-043129 | | 2/2000 |
| JP | 2005-254704 | | 9/2005 |
| JP | 2005-529002 | | 9/2009 |
| KR | 10-0147442 | | 8/1998 |
| KR | 2006-0105883 | | 10/2006 |
| KR | 10-2006-0128062 | | 12/2006 |
| WO | WO02/24435 | | 3/2002 |
| WO | WO03/095179 | | 11/2003 |
| WO | WO2004/065105 | | 8/2004 |
| WO | WO2005/044540 | | 5/2005 |
| WO | WO2007/120807 | | 10/2007 |

OTHER PUBLICATIONS

International Search Report and Written Opinion dated May 30, 2012 in corresponding International Patent Application No. PCT/US2011/056057 (six pages).

International Search Report and Written Opinion dated Jun. 15, 2012 in corresponding International Patent Application No. PCT/US2011/051293 (eight pages).

International Search Report and Written Opinion dated Apr. 17, 2012 in corresponding PCT International Patent Application No. PCT/US2011/051284 (nine pages).

International Search Report and Written Opinion dated Apr. 18, 2012 in corresponding PCT International Patent Application No. PCT/US2011/051289 (nine pages).

International Search Report and Written Opinion dated May 8, 2012 in corresponding International Patent Application No. PCT/US2011/054584 (six pages).

International Search Report and Written Opinion dated May 9, 2012 in corresponding International Patent Application No. PCT/US2011/056053 (six pages).

International Search Report and Written Opinion dated Oct. 29, 2012 corresponding International Patent Application No. PCT/US2012/024950 (seven pages).

International Search Report and Written Opinion dated Sep. 28, 2012 in corresponding International Patent Application No. PCT/US2012/024954 (six pages).

* cited by examiner

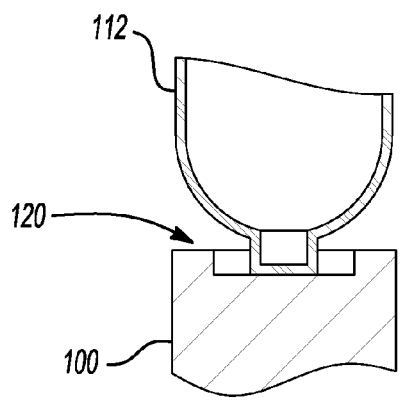
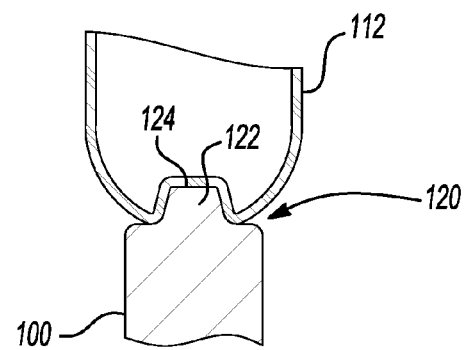
*Fig-2A*  *Fig-2B*
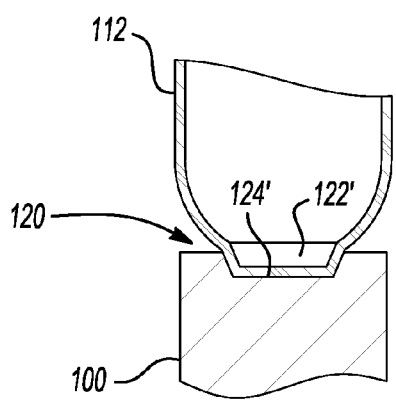
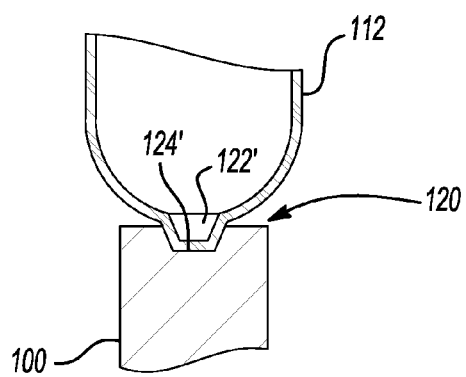
*Fig-2C*  *Fig-2D*

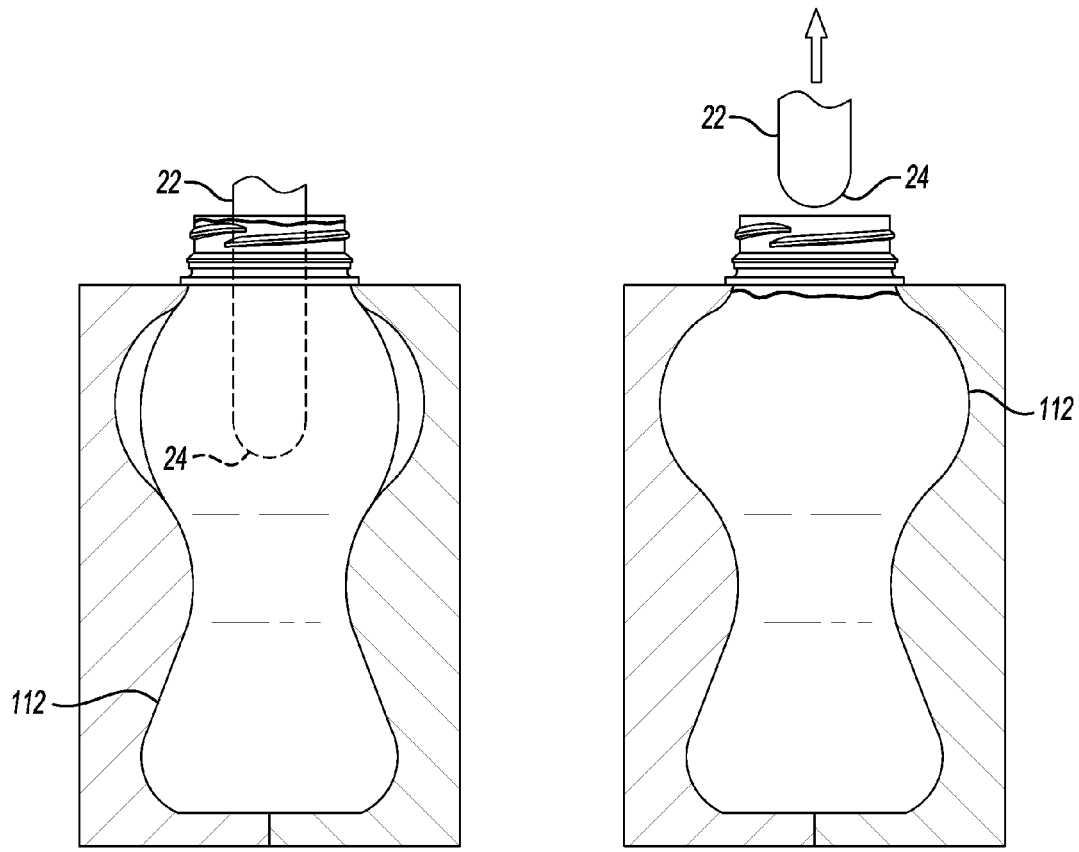
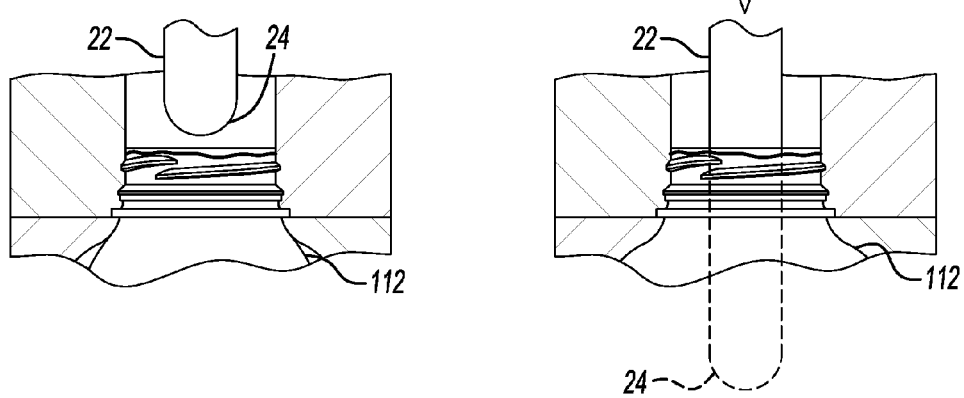

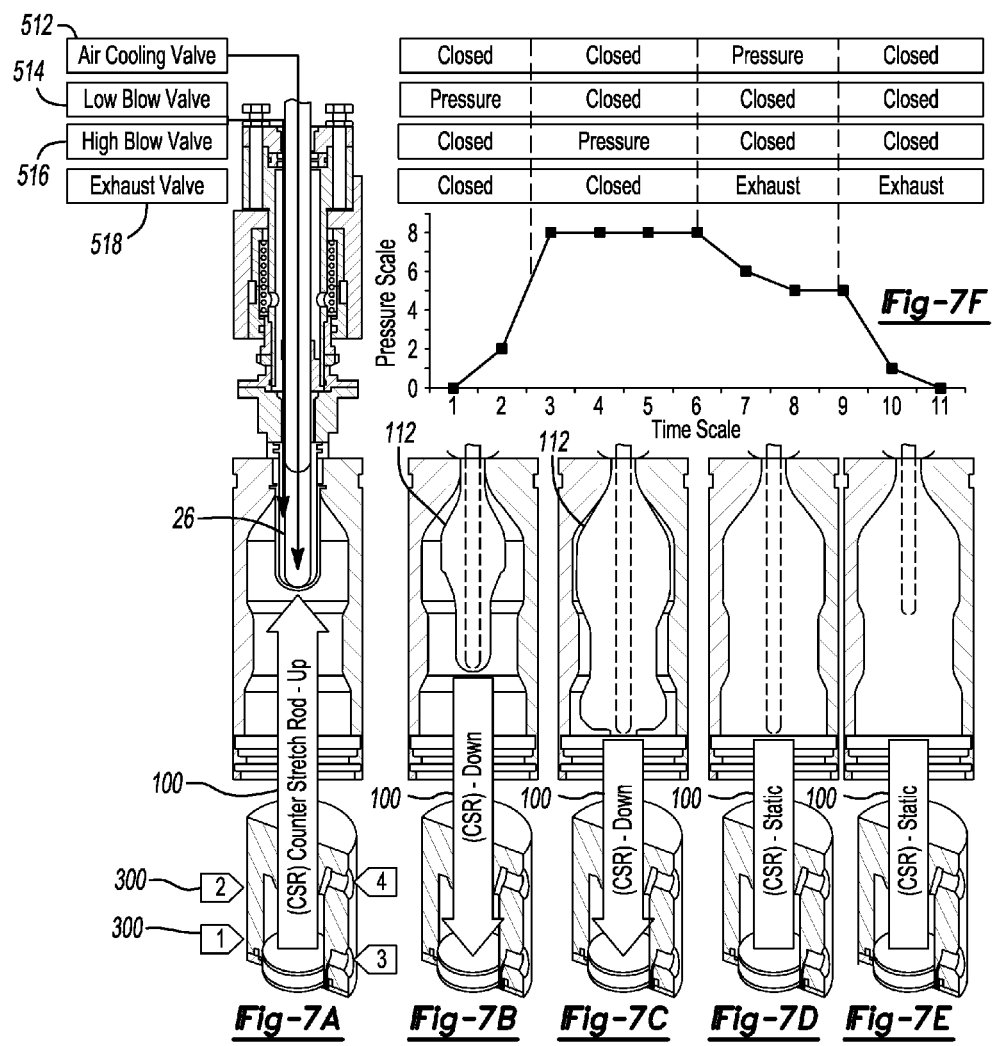
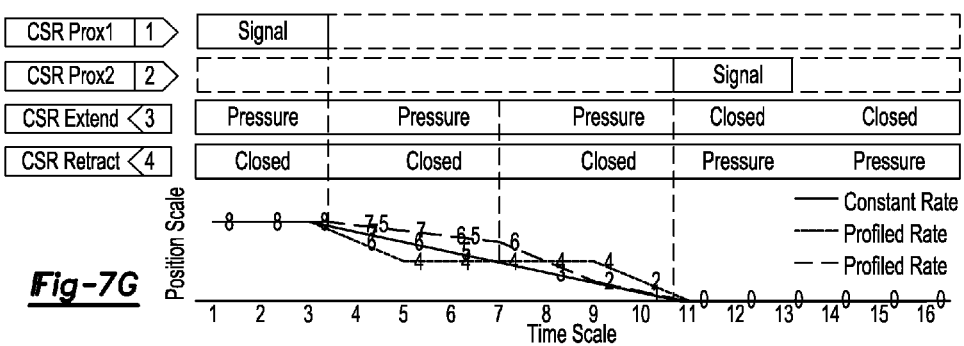

REVERSE STRETCH ROD FOR MACHINE HYGIENE AND PROCESSING

CROSS-REFERENCE TO RELATED APPLICATIONS

This application claims the benefit of U.S. Provisional Application No. 61/442,906, filed on Feb. 15, 2011. The entire disclosure of the above application is incorporated herein by reference.

FIELD

This disclosure generally relates to forming a container for retaining a commodity, such as a solid or liquid commodity. More specifically, this disclosure relates to a centering device for use with a forming apparatus for forming blown plastic containers that minimizes contamination and maintains a preform in a desired orientation.

BACKGROUND

This section provides background information related to the present disclosure which is not necessarily prior art.

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

SUMMARY

This section provides a general summary of the disclosure, and is not a comprehensive disclosure of its full scope or all of its features.

According to the principles of the present disclosure, a mold device for forming a plastic container from a preform is provided. The mold device comprises a mold defining a mold cavity and a central exterior rod system moveably disposed within the mold cavity. The central exterior rod system is positionable between an extended position engagable with the preform and a retracted position spaced apart from the preform. The central exterior rod system maintains a central orientation of the preform during formation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 2A-2D illustrate a plurality of locating features according to the principles of the present teachings;

FIGS. 3A-3B illustrate a stretch initiation rod being withdrawn from a container to create a fluid headspace;

FIGS. 4A-4B illustrate a stretch initiation rod being inserted into a container to create a fluid pressure spike;

FIGS. 7A-7G illustrate use of the present teachings in conjunction with various valves and sensors, which result in various control profiles.

Corresponding reference numerals indicate corresponding parts throughout the several views of the drawings.

DETAILED DESCRIPTION

Figure 1D:
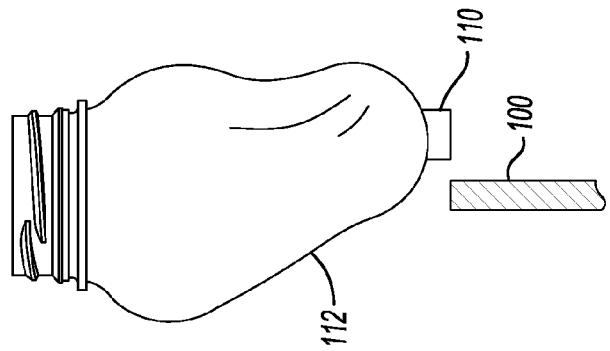
FIG. 1D illustrates a schematic side view illustrating a slipped condition of a conventional central rod.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present teachings provide for a stretch blow molding machine having a centering device operable for engaging a preform container during the molding process and a stretch initiation device operable to create a stretch initiation area on the preform container. The stretch initiation device, unlike conventional molding machines, can be used to initiate the stretching of the preform and encourage the preform to later engage the centering device. The centering device of the present teachings, unlike conventional molding machines, provides improved control for maintaining the preform in a predetermined orientation to minimize contact of the stretch rod to the preform, which would result in contamination of the finished container.

As will be discussed in greater detail herein, the shape of the container described in connection with the present teachings can be any one of a number of variations. By way of non-limiting example, the container of the present disclosure can be configured to hold any one of a plurality of commodities, such as beverages, food, or other hot-fill type materials.

It should be appreciated that the size and the exact shape of the centering device are dependent on the size and shape of the container to be formed. Therefore, it should be recognized that variations can exist in the presently described designs.

The present teachings relate to the forming of one-piece plastic containers. Generally, these containers, after formation, generally define a body that includes an upper portion having a cylindrical sidewall forming a finish. Integrally formed with the finish and extending downward therefrom is a shoulder portion. The shoulder portion merges into and provides a transition between the finish and a sidewall portion. The sidewall portion extends downward from the shoulder portion to a base portion having a base. An upper transition portion, in some embodiments, may be defined at a transition between the shoulder portion and the sidewall portion. A lower transition portion, in some embodiments, may be defined at a transition between the base portion and the sidewall portion.

The exemplary container may also have a neck. The neck may have an extremely short height, that is, becoming a short extension from the finish, or an elongated height, extending between the finish and the shoulder portion. The upper portion can define an opening. Although the container is shown as a drinking container and a food container, it should be appreciated that containers having different shapes, such as sidewalls and openings, can be made according to the principles of the present teachings.

The finish of the plastic container may include a threaded region having threads, a lower sealing ridge, and a support ring. The threaded region provides a means for attachment of a similarly threaded closure or cap (not illustrated). Alternatives may include other suitable devices that engage the finish of the plastic container, such as a press-fit or snap-fit cap for example. Accordingly, the closure or cap (not illustrated) engages the finish to preferably provide a hermetical seal of the plastic container. The closure or cap (not illustrated) is preferably of a plastic or metal material conventional to the closure industry and suitable for subsequent thermal processing.

The container can be formed according to the principles of the present teachings. A preform version of container includes a support ring, which may be used to carry or orient the preform through and at various stages of manufacture. For example, the preform may be carried by the support ring, the support ring may be used to aid in positioning the preform in a mold cavity, or the support ring may be used to carry an intermediate container once molded. At the outset, the preform may be placed into the mold cavity such that the support ring is captured at an upper end of the mold cavity. In general, the mold cavity has an interior surface corresponding to a desired outer profile of the blown container. More specifically, the mold cavity according to the present teachings defines a body forming region, an optional moil forming region and an optional opening forming region. Once the resultant structure, hereinafter referred to as an intermediate container, has been formed, any moil created by the moil forming region may be severed and discarded. It should be appreciated that the use of a moil forming region and/or opening forming region are not necessarily in all forming methods.

In one example, a machine places the preform heated to a temperature between approximately 190° F. to 250° F. (approximately 88° C. to 121° C.) into the mold cavity. The mold cavity may be heated to a temperature between approximately 250° F. to 350° F. (approximately 121° C. to 177° C.). An internal stretch rod apparatus stretches or extends the heated preform within the mold cavity to a length approximately that of the intermediate container thereby molecularly orienting the polyester material in an axial direction generally corresponding with the central longitudinal axis of the container. While the stretch rod extends the preform, air and/or liquid (also referred to generally as fluid) having a pressure between 100 PSI to 1000 PSI assists in extending the preform in the axial direction and in expanding the preform in a circumferential or hoop direction thereby substantially conforming the polyester material to the shape of the mold cavity and further molecularly orienting the polyester material in a direction generally perpendicular to the axial direction, thus establishing the biaxial molecular orientation of the polyester material in most of the intermediate container. The pressurized fluid holds the mostly biaxial molecularly oriented polyester material against the mold cavity for a period of approximately two (2) to five (5) seconds before removal of the intermediate container from the mold cavity. This process is known as heat setting and results in a heat-resistant container suitable for filling with a product at high temperatures.

With particular reference to FIGS. 1A-4B, conventional stretch blow molding systems can employ a central interior stretch initiation rod system 20 that can engage an interior feature or surface of a preform 112 and/or a central exterior rod system 100 that can engage an exterior feature 110, or other portion, of the preform 112. It should be appreciated that according to the principles of the present teachings, central interior stretch initiation rod system 20 and central exterior rod system 100 can be used separately or in combination.

With particular reference to FIGS. 1A, 3A, 3B, 4A, 4B, 5A, and 5B, in some embodiments, stretch initiation rod system 20 can be raised and lowered relative to preform 112 to provide a mechanical urging force against an interior surface of preform 112. Stretch initiation rod system 20 can comprise a rod member 22 having a distal tip 24, an elongated shaft 26, and a drive system 28 coupled to the elongated shaft 26 to actuate distal tip 24 between a retracted (see FIGS. 3B and 4A) and an extended (see FIGS. 1A, 3A, and 4B) position. Drive system 28 can comprise a hydraulic drive system, mechanical drive system, pneumatic drive system, a servo drive system, or other known system for creating motion of rod member 22. In some embodiments, drive system 28 includes a servo or positive stop to provide positioning information. Moreover, in some embodiments, systems can be used for real time tracking a position and/or drive speed of rod member 22 to provide real-time control. In some embodiments, such real-time control can employ sensors and/or proximity devices coupled to a microprocessor to output a control signal. Still further, it should be appreciated that although rod member 22 is described and illustrated as being cylindrical with a rounded tip, other shapes and tips are envisioned, including but not limited to conical, non-uniform, tapered, pointed, flattened, and the like or can be varied to define a predetermined volume.

It should be noted, however, that stretch initiation rod system 20 can be separate from or joined with a typical central rod of a blow molding system. That is, a stretch initiation rod system 20 can be separately formed or integrally formed with the central rod. Stretch initiation rod system 20 can, however, employ distal tip 24 to engage or otherwise contact preform 112 to define the stretch initiation area and/or prestretch. By way of non-limiting example, prestretches of about 40 mm have been found to be beneficial, however other prestretch lengths, such as the distance X of FIG. 1A, may be appropriate. This insures a known stretching response and material distribution during molding, rather than the unpredictable stretching response common with conventional molding systems. This material distribution can include non-uniform distribution for predetermined design criteria.

In some embodiments, it has been found that stretch initiation rod system 20, especially when being used in connection with a liquid forming medium, need not stretch the preform to its final container length/height. That is, it has been found that stretch initiation rod system 20 can be used to only initiate the stretching of preform 112, without having to fully stretch the preform 112, which is conventional in the art. In fact, it has been found that in some embodiments stretch initiation system 20 can stretch preform 112 a distance that is less than the total intended height of the container (e.g. less than 100% of the final container height). In some embodiments, stretch initiation system 20 can stretch preform 112 less than 75%, less than 50%, less than 25%, or even less than 10% of the final container height.

Figure 1C:
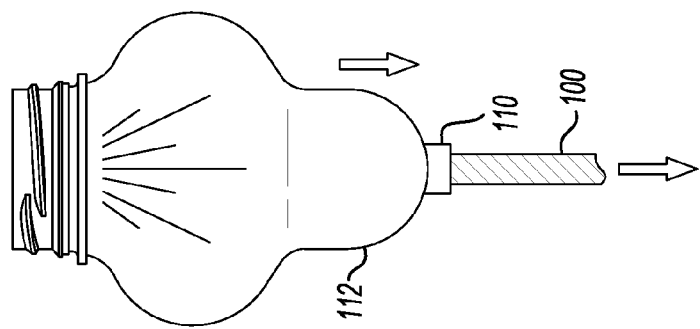
FIGS. 1A-1C illustrate a series of schematic side views illustrating a central rod guiding a preform during the forming process.
Figure 1B:
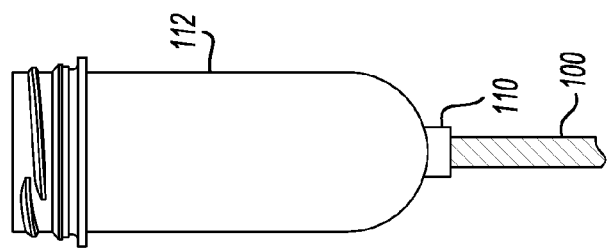
Figure 1A:
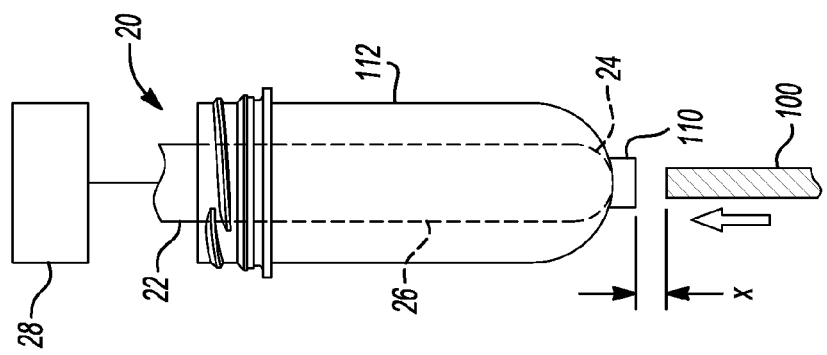

With reference to FIGS. 1A-1D, central exterior rod system 100 can be used, ideally, to maintain preform 112 in a predetermined orientation during the stretch blow forming process as illustrated in FIGS. 1A-1C. Central interior stretch initiation rod 20 can be used to initiate the forming process. In this way, the preform 112 is initially stretched to achieve a predetermined molding response using stretch initiation rod system 20 and then centrally maintained by central exterior rod system 100 relative to the stretch rod and/or stretch initiation rod system 20 extending therein, thereby ensuring that the stretch rod(s) does not further contact the inside of the preform or at least has only limited contact with the inside of the preform. Such contact of the stretch rod within the preform can cause contamination of the resultant container, thereby requiring the resultant container to be discarded or sanitized. Hence, limited contact or elimination of contact can be advantageous in some embodiments.

Figure 5D:
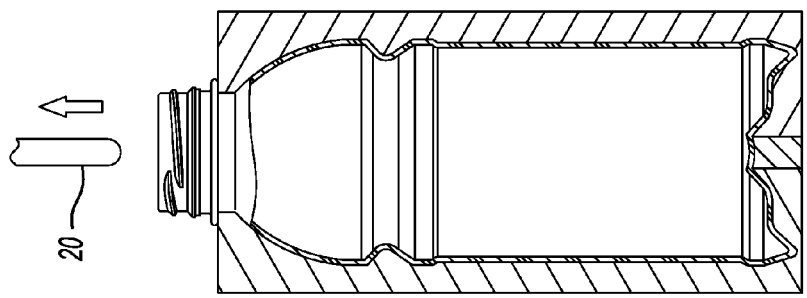
FIGS. 5A-5D illustrate a series of schematic side views illustrating a central rod guiding a preform during the forming process.
Figure 5C:
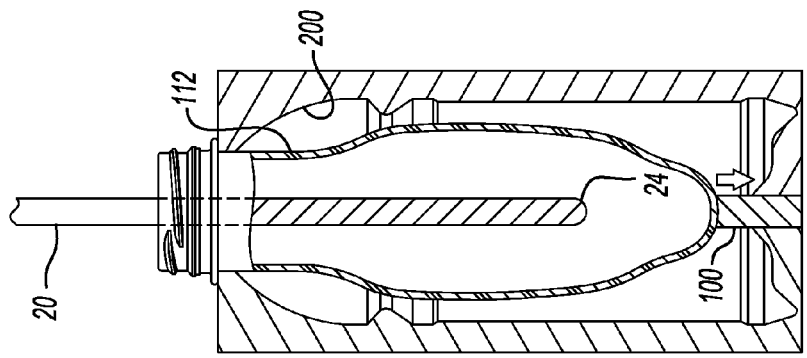
Figure 5B:
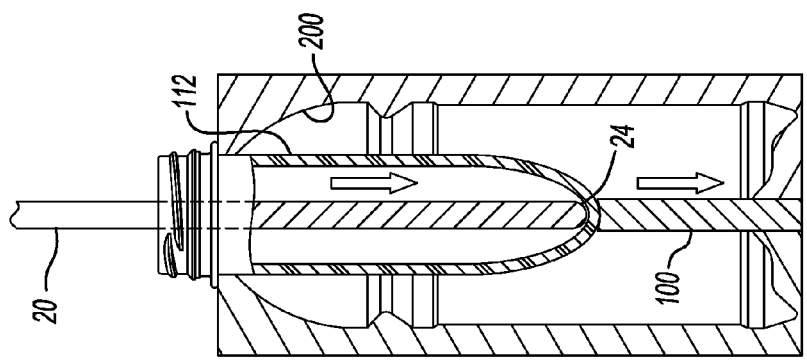
Figure 5A:
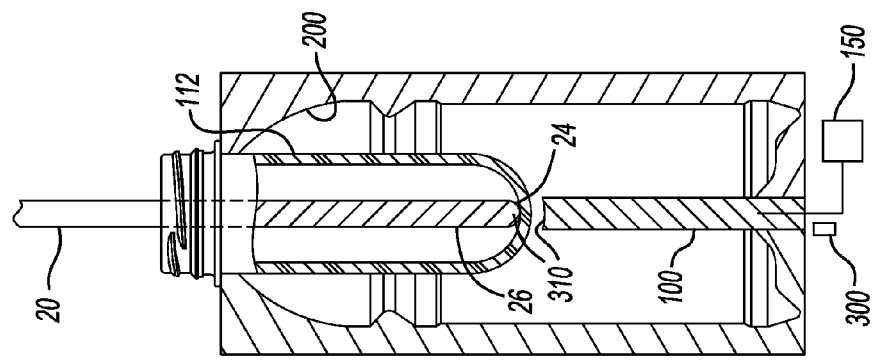

More particularly, with reference to FIGS. 5A-5D, in some embodiments central exterior rod system 100 can be use in concert or together with stretch initiation rod system 20 to maintain a controlled forming of preform 112. In this way, as illustrated in FIG. 5A, stretch initiation rod system 20 can be used to initiate the stretching of preform 112. In some embodiments, prior to the initiation of stretching, a distal end of preform 112 can be spaced apart from a distal tip of central exterior rod system 100 (note space between distal tip of central exterior rod system 100 and distal end of preform 112 in FIG. 5A). In this way, stretch initiation rod system 20 can be used to cause an initial stretch of preform 112 such that the distal end of preform 112 contacts and is received by the distal tip of central exterior rod system 110. Once contact is made between preform 112 and central exterior rod system 110, central exterior rod system 110 can be used to maintain proper alignment of preform 112 within mold cavity 200.

In some embodiments, stretch initiation rod system 20 can be to further stretch preform 112 in an extended direction (downward in FIGS. 5A-5D). This movement of stretch initiation rod system 20 can be keyed to the simultaneous retraction of central exterior rod system 100 (and, in some embodiments, the application of internal fluid pressure within preform 112) to control the expansion of preform 112 into the final container shape and arrangement. In some embodiments, stretch initiation rod system 20 can be stopped at an intermediate position prior to full expansion of preform 112 and the continued shaping of preform 112 can be done through the combination of the application of internal fluid pressure and the controlled retraction of central exterior rod system 100 (see FIG. 5C). This step can be used to minimize the possibility of stretch initiation rod system 20 contacting preform 112 during the shaping process, thereby minimizing the possibility of container contamination, while still providing sufficient guidance of preform 112 during the shaping process. Finally, as illustrated in FIG. 5D, central exterior rod system 20 can be fully retracted into the base area of the mold cavity 200 to permit full expansion of preform 112 into mold cavity 200. Moreover, as illustrated in FIG. 5D, stretch initiation rod system 20 can be fully retracted out of the finally formed container.

Central exterior rod system 100 can be positionable between a retracted position (see FIGS. 5D and 6D) and an extended position (see FIGS. 5A-5C and 6A-6C). A drive system 150 (see FIGS. 5A and 6A) can comprise a pneumatic drive system, a servo drive system, or other known system for creating motion of central exterior rod system 100. In some embodiments, drive system 150 includes a servo or positive stop to provide positioning information. Moreover, in some embodiments, systems can be used for real time tracking a position and/or drive speed central exterior rod system 100 to provide real-time control.

In some embodiments, drive system 150 can comprise an air cylinder for driving central exterior rod system 100. It should be noted, however, that although drive system 150 is described in connection with central exterior rod system 100, drive system 150 or a separate drive system similar to drive system 150 can be used for actuating stretch initiation rod system 20. Therefore, it should be understood that discussion relating to drive system 150 and central exterior rod system 100 is equally applicable to a drive system for use with stretch initiation rod system 20. In some embodiments, drive system 150 can operate using an air cylinder having a pressure of about 20-60 psi, which results in an applied force of about 80-120 lbs against the preform 112. In some embodiments, this force must be less than the opposing force of the preform expanding, so that the external rod is in contact with the preform (helping alignment and centering) and is pushed down as the preform expands. If air pressure is constant, the rate of movement is determined by the force of the expanding preform and/or stretch initiation rod system 20. In some embodiments, air pressure can be varied to modify the force, pressure, and/or rate of movement.

In some embodiments, central exterior rod system 100 and/or stretch initiation rod system 20 can employ proximity and/or velocity sensors 300 (see FIGS. 5A and 6A) to detect the position of central exterior rod system 100 and/or stretch initiation rod system 20. In this way, the proximity sensors can be used to determine the position (e.g. extended, retracted, and/or any intermediate discrete positions), rate, loads, and timing of the various components of central exterior rod system 100 and/or stretch initiation rod system 20 (e.g. elongated shaft 26). This information from the proximity sensors can be communicated and/or displayed to an operator or control system(s). In this way, the operator and/or control system can determine the position of the various components (e.g. rods) in relation to the preform and blow molding process, thereby allowing for processing adjustments, synchronization, and the like. In some embodiment, central exterior rod system 100 and/or stretch initiation rod system 20 can be controlled by a servo and the aforementioned proximity and/or velocity sensors can be used to control the servo.

With particular reference to FIGS. 7A-7G, in some embodiments, proximity sensors 300, such as a first central exterior rod proximity sensor 300' and a second central exterior rod proximity sensor 300", and various valves, such as air cooling valve 512, low blow valve 514, high blow valve 516, and exhaust valve 518, can be used in concert to monitor and control the processing of preform 112. Proximity sensors 300, 300', 300" can be used to monitor the position of central exterior rod system 100. As seen in FIGS. 7F and 7G, each of the proximity sensors 300', 300" can be configured to detect proximity and output a signal (see figures) and valves 512, 514, 516, and 518 can be controlled to move from a closed position (see figures) to an open, pressurized position (see figures). The collective operation of the several valves in response to the various sensors can be used to define a profile curve (see FIGS. 7F and 7G). With reference to FIG. 7F, internal pressure within preform 112 can be profiled relative to a time scale. In this regard, pressure can be modified to achieve a predetermined and beneficial pressure profile curve. Likewise, the position of central exterior rod system 100 can be profiled relative to a time scale. In this regard, the position of central exterior rod system 100 can be modified such that the relative position of central exterior rod system 100 compared to preform 112 can be gradual (e.g. constant rate retraction) or varied (e.g. non-constant rate retraction).

Figure 6D:
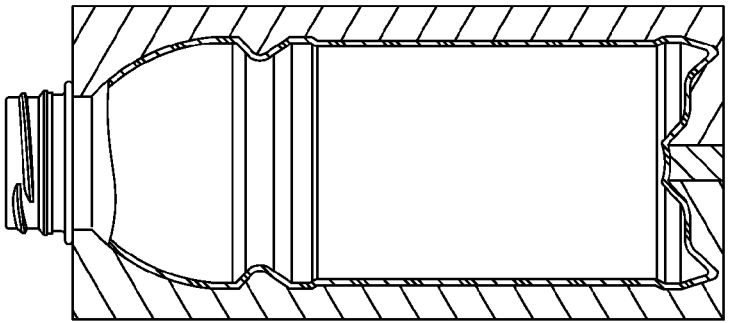
FIGS. 6A-6D illustrate a series of schematic side views illustrating a central rod guiding a preform during the forming process without the use of a stretch rod.
Figure 6C:
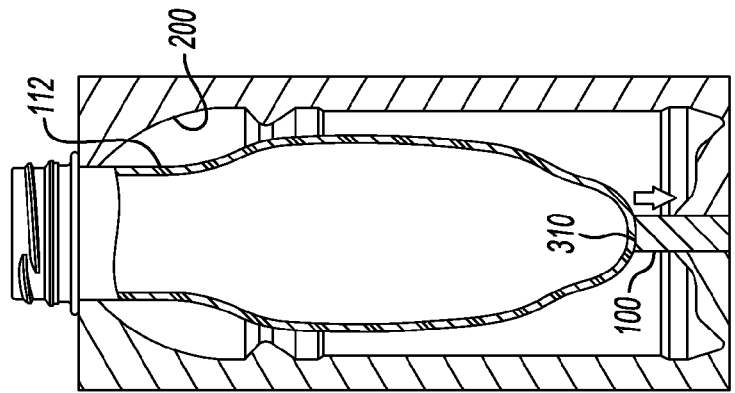
Figure 6B:
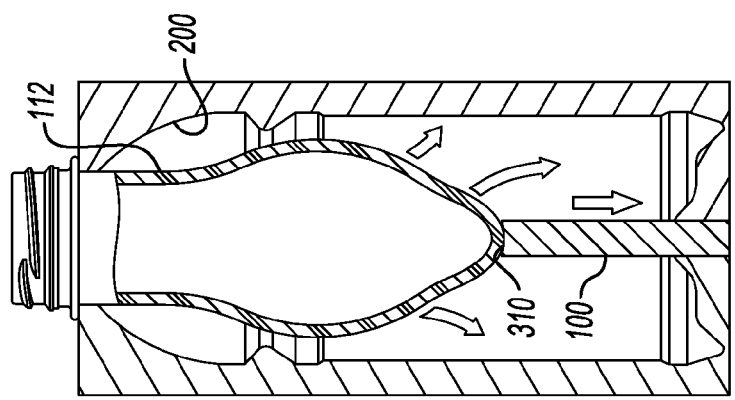
Figure 6A:
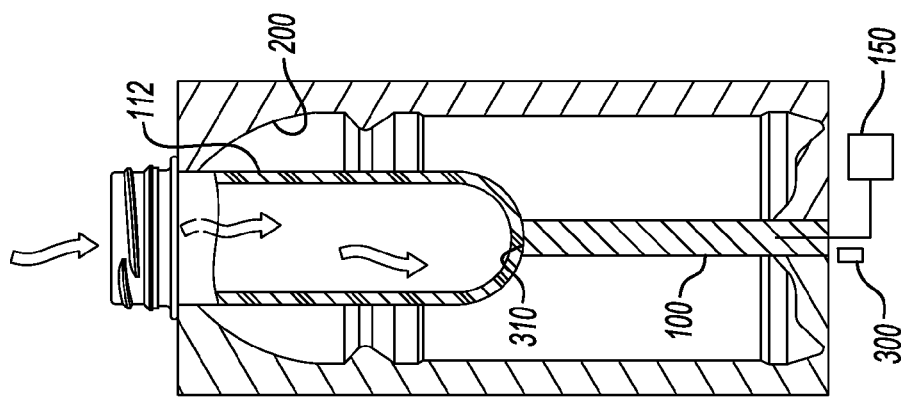

In some embodiments, as illustrated in FIGS. 5A and 6A, contact and/or pressure sensors 310 can be used on central exterior rod system 100 and/or stretch initiation rod system 20, such as on the distal tip of an associated rod (e.g. rod 26), to detect contact with the preform or other structure. Microprocessor can then be used to monitor signals and control servo timing and position. Moreover, movement and rate can be computer controlled, such as fixed or variable, thereby allowing the motion of the central exterior rod system 100 and/or stretch initiation rod system 20 to be "profiled" to follow and manipulate expansion of the preform.

Still further, in some embodiments, central exterior rod system 100 can assist in ejecting the base portion of the final container from the mold using either air cylinder or servo method.

It should be recognized, however, that in some embodiments as illustrated in FIGS. 6A-6D, preform 112 can be expanded and shaped using only sufficient application of internal fluid pressure and the central exterior rod system 100. That is, as illustrated in FIG. 6A, fluid can be introduced into the interior volume of preform 112 through the preform opening. As this point, the distal tip of central exterior rod system 100 can contact or be closely positioned relative to preform 112 to engage, contact, and/or guide preform 112 during the subsequent expansion. Central exterior rod system 100 can be slowly retracted during the expansion of preform 112 caused by the continued introduction of internal fluid under pressure. It should be understood that the rate of retraction of central exterior rod system 100 can be set such that it encourages a predetermined expansion profile. In some embodiments, retraction of central exterior rod system 100 can be continuous, while in some embodiments retraction of central exterior rod system 100 can be staged to encourage alternating expansion in both length and width of the container. Such controlled retraction of central exterior rod system 100 can be dependent upon the specific container being formed. Finally, as illustrated in FIGS. 6C-6D, central exterior rod system 20 can be fully retracted into the base area of the mold cavity 200 to permit full expansion of preform 112 into mold cavity 200.

In some embodiments, stretch initiation rod system 20 can be used to achieve a precise headspace within the final filled container. Specifically, as seen in FIGS. 3A-3B, stretch initiation rod system 20 can be actuated and/or sized such that following formation of the preform 112 into the final container (which is done with the final fill commodity), retraction of rod member 22 can represent a precise volume (that is, the volume of rod member 22 disposed within the final fill commodity) that when retracted provides the desired headspace for packaging and shipment. Such precise headspace is achieved without complex valve systems and the like.

Moreover, in some embodiments, stretch initiation rod system 20 can be used to achieve a fluid pressure spike to aid in the shaping of preform 112. Specifically, as seen in FIGS. 4A-4B, stretch initiation rod system 20 can be actuated such that the fluid volume displaced by rod member 22 is greater than a headspace within the preform 112, such that insertion of rod member 22 into the preform 112 causes a pressure spike within the preform 112. Such pressure spikes can be used to define final details within the preform 112.

Turning now to FIG. 1D, in some embodiments, preform 112 may form in such a way as to slip off or become disengaged from the central exterior rod system 100. This can often lead to damage to the preform by contact with the central exterior rod system 100 and/or contamination with the internal stretch rod.

To overcome this issue, with reference to FIGS. 2A-2D, in some embodiments, central exterior rod system 100 can comprise a locating feature 120 for engaging or otherwise contacting the preform 112. Locating feature 120 can comprise, in some embodiments, a protruding portion 122 defining a first shape. A corresponding depression 124, having a complementary shape to the first shape, can be formed as part of preform 112. In this way, protruding portion 122 can be positively received within depression 124 to define a reliable connection therebetween. In some embodiments, protruding portion 122 is sized and shaped to closely conform to depression 124 to minimize lateral movement (that is, movement in a hoop direction). The shape of protruding portion 122, and consequently depression 124, can be cylindrical (FIGS. 2A and 2B), tapered (FIGS. 2C and 2D), wide (FIG. 2C), narrow (FIGS. 2B and 2D), or any other shape/size that provides a reliable connection between central exterior rod system 100 and preform 112. It should be appreciated that locating feature 120 can define a reverse orientation (indicated with similar primed reference numbers) to those already described in that the locating feature 120 can comprise a protruding portion extending from the preform (FIGS. 2C and 2D) for engaging a depression formed in the central exterior rod system 100.

Alternatively, other manufacturing methods, such as for example, extrusion blow molding, one step injection stretch blow molding and injection blow molding, using other conventional materials including, for example, thermoplastic, high density polyethylene, polypropylene, polyethylene naphthalate (PEN), a PET/PEN blend or copolymer, and various multilayer structures may be suitable for the manufacture of plastic container and used in connection with the principles of the present teachings.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A mold device for forming a plastic container from a preform, said mold device comprising:
a mold defining a mold cavity; and
a central exterior rod system moveably disposed within said mold cavity, said central exterior rod system being positionable between an extended position engageable with the preform and a retracted position spaced apart from the preform, said central exterior rod system maintaining a central orientation of the preform during forming, and a sensor associated with said central exterior rod system for detecting a position, between said extended position and said retracted position, said sensor being a velocity sensor.

2. The mold device according to claim 1, further comprising:
a pressure source operably coupled with said mold, said pressure source introducing a pressurized fluid into the preform.

3. The mold device according to claim 2 wherein said pressurized fluid is air.

4. The mold device according to claim 2 wherein said pressurized fluid is liquid.

5. The mold device according to claim 1 wherein said central exterior rod system further comprises a locating feature engageable with the preform.

6. The mold device according to claim 5 wherein said locating feature of said central exterior rod comprises a protrusion extending therefrom.

7. The mold device according to claim 6 wherein said protrusion is cylindrically shaped.

8. The mold device according to claim 6 wherein said protrusion is tapered.

9. The mold device according to claim 5 wherein said locating feature of said central exterior rod comprises a depression formed therein, said depression being sized and shaped to closely receive a feature of the preform therein.

10. The mold device according to claim 1 wherein said sensor includes a proximity sensor.

11. The mold device according to claim 1, further comprising:
a contact sensor associated with said central exterior rod system for detecting contact between said central exterior rod system and the preform.

12. The mold device according to claim 1 wherein said central exterior rod system comprises a drive system.

13. The mold device according to claim 12 wherein said drive system comprises a servo drive system.

14. A mold device for forming a plastic container from a preform, said mold device comprising:
a mold defining a mold cavity;
a stretch initiation rod system moveably disposed within said mold cavity, said stretch initiation rod system being contactable with the preform, said stretch initiation rod system operable to exert a stretching force upon the preform;

a central exterior rod system moveably disposed within said mold cavity, said central exterior rod system being positionable between an extended position engageable with the preform and a retracted position spaced apart from the preform, said central exterior rod system maintaining a central orientation of the preform during forming; and a contact sensor associated with at least one of said stretch initiation rod system and said central exterior rod system for detecting contact with the preform.

15. The mold device according to claim 14 wherein said stretch initiation rod system and said central exterior rod system are operable to exert a force in opposing directions relative to each other.

16. The mold device according to claim 14, further comprising:
a pressure source operably coupled with said mold, said pressure source introducing a pressurized fluid into the preform.

17. The mold device according to claim 16 wherein said pressurized fluid is air.

18. The mold device according to claim 16 wherein said pressurized fluid is liquid.

19. The mold device according to claim 14 wherein said central exterior rod system further comprises a locating feature engageable with the preform.

20. The mold device according to claim 19 wherein said locating feature of said central exterior rod comprises a protrusion extending therefrom.

21. The mold device according to claim 20 wherein said protrusion is cylindrically shaped.

22. The mold device according to claim 20 wherein said protrusion is tapered.

23. The mold device according to claim 19 wherein said locating feature of said central exterior rod comprises a depression formed therein, said depression being sized and shaped to closely receive a feature of the preform therein.

24. The mold device according to claim 14, further comprising:
a sensor associated with at least one of said stretch initiation rod system and said central exterior rod system for detecting a position thereof.

25. The mold device according to claim 24 wherein said sensor is a proximity sensor.

26. The mold device according to claim 24 wherein said sensor is a velocity sensor.

27. The mold device according to claim 14 wherein said stretch initiation rod system is operable to exert a stretching force upon the preform for a distance less than the total height of the plastic container.

28. The mold device according to claim 14 wherein said stretch initiation rod system is operable to exert a stretching force upon the preform for a distance less than 50% of the total height of the plastic container.

29. The mold device according to claim 14 wherein said stretch initiation rod system is operable to exert a stretching force upon the preform for a distance less than 10% of the total height of the plastic container.

30. The mold device according to claim 14 wherein said central exterior rod system comprises a drive system.

31. The mold device according to claim 30 wherein said drive system comprises a servo drive system.

32. A mold device for forming a plastic container from a preform, said mold device comprising:
a mold defining a mold cavity; and
a central exterior rod system moveably disposed within said mold cavity, said central exterior rod system being positionable between an extended position engageable with the preform and a retracted position spaced apart from the preform, said central exterior rod system maintaining a central orientation of the preform during forming, and a contact sensor associated with said central exterior rod system for detecting contact between said central exterior rod system and the preform.

33. A mold device for forming a plastic container from a preform, said mold device comprising:
a mold defining a mold cavity; and
a central exterior rod system moveably disposed within said mold cavity, said central exterior rod system being positionable between an extended position engageable with the preform and a retracted position spaced apart from the preform, said central exterior rod system maintaining a central orientation of the preform during forming, and a control system associated with said central exterior rod system, said control system being arranged for allowing processing adjustments.

34. A mold device according to claim 33 wherein said control system comprises a sensor associated with said central exterior rod system, said sensor being arranged for determining at least one parameter comprised of the group including; a position of a component of said central exterior rod system, a speed of a component of said central exterior rod system, a load of a component of said central exterior rod system, a timing of a component of said central exterior rod system, a contact status of said central exterior rod system with the preform, and internal pressure within the preform.

* * * * *